US012507615B2

(12) United States Patent
Zhou et al.

(10) Patent No.: US 12,507,615 B2
(45) Date of Patent: Dec. 30, 2025

(54) CULTIVATION METHOD FOR INCREASING YIELD OF RATOONING RICE AND REDUCING CADMIUM CONTENT AND USE THEREOF

(71) Applicants: INSTITUTE OF SOIL SCIENCE, CHINESE ACADEMY OF SCIENCES, Nanjing (CN); JIANGXI JIEDI ENVIRONMENTAL TREATMENT & ECOLOGICAL TECHNOLOGY CO., LTD, Yingtan (CN)

(72) Inventors: Jing Zhou, Nanjing (CN); Laiyong You, Nanjing (CN); Jiani Liang, Nanjing (CN); Lingli Zhou, Nanjing (CN); Mengli Liu, Nanjing (CN); Ruiyun Tian, Nanjing (CN)

(73) Assignees: INSTITUTE OF SOIL SCIENCE, CHINESE ACADEMY OF SCIENCES, Nanjing (CN); JIANGXI JIEDI ENVIRONMENTAL TREATMENT & ECOLOGICAL TECHNOLOGY CO., LTD, Yingtan (CN)

( * ) Notice: Subject to any disclaimer, the term of this patent is extended or adjusted under 35 U.S.C. 154(b) by 0 days.

(21) Appl. No.: 17/915,115

(22) PCT Filed: May 23, 2022

(86) PCT No.: PCT/CN2022/094336
§ 371 (c)(1),
(2) Date: Sep. 28, 2022

(87) PCT Pub. No.: WO2023/184682
PCT Pub. Date: Oct. 5, 2023

(65) Prior Publication Data
US 2025/0017136 A1     Jan. 16, 2025

(30) Foreign Application Priority Data

Apr. 2, 2022 (CN) .................... 202210351001.5

(51) Int. Cl.
*A01C 21/00* (2006.01)
*A01G 22/22* (2018.01)

(52) U.S. Cl.
CPC ............ *A01C 21/005* (2013.01); *A01G 22/22* (2018.02)

(58) Field of Classification Search
CPC ....... A01C 21/005; A01C 21/00; A01G 22/22; A01G 22/20; A01G 22/00
See application file for complete search history.

(56) References Cited

FOREIGN PATENT DOCUMENTS

CN    111316805 A  *  6/2020  ........... A01C 21/005
JP   2004222622 A  *  8/2004  ............... A01G 7/00

OTHER PUBLICATIONS

Zheng, Wenkai et al., "Characteristics and High-yielding Cultivation Techniques of Hybrid Rice Combination Luyou 9803 with Low Cadmium Accumulation", (Hybrid Rice), vol. 34, No. 02, Mar. 31, 2019 (Mar. 31, 2019), ISSN: 1005-3956, pp. 38-40 (Year: 2019).*

(Continued)

*Primary Examiner* — Christopher J. Novosad
(74) *Attorney, Agent, or Firm* — Gearhart Law LLC

(57) ABSTRACT

A cultivation method for increasing yield of ratooning rice and reducing Cd content and use thereof, belonging to the technical field of agricultural planting. The cultivation method for increasing yield of ratooning rice and reducing Cd content comprises sowing seeds of ratooning rice in middle and late March of a year, conducting transplantation in middle April of the year for growth in a Cd-contaminated rice field, performing water and fertilizer management of a first season rice, harvesting the first season rice at a position between 1st and 2nd last nodes thereof and performing water (Continued)

and fertilizer management of a second season rice. The cultivation method may significantly increase the yield of ratooning rice, significantly reduce the content of Cd in brown rice of ratooning rice season, and is of great significance for the safe utilization of contaminated farmland.

8 Claims, 2 Drawing Sheets

Specification includes a Sequence Listing.

(56) References Cited

OTHER PUBLICATIONS

Chen, Jiwang et al., "Cadmium Accumulation and Distribution in Ratooning Rice from Different Nodes and its Differences with Main Crop", (Journal of Southern Agriculture), vol. 51, No. 04, Apr. 30, 2020 (Apr. 30, 2020), ISSN: 2095-1191, pp. 790-797 (Year: 2020).*

* cited by examiner

SEQUENCE LISTING

<160> NUMBER OF SEQ ID NOS: 4

<210> SEQ ID NO 1
<211> LENGTH: 20
<212> TYPE: DNA
<213> ORGANISM: Artificial Sequence

```
<220> FEATURE:
<223> OTHER INFORMATION: forward primer of OsHMA2

<400> SEQUENCE: 1
cgccatctcc caatcccaaa                                              20

<210> SEQ ID NO 2
<211> LENGTH: 19
<212> TYPE: DNA
<213> ORGANISM: Artificial Sequence
<220> FEATURE:
<223> OTHER INFORMATION: reverse primer of OsHMA2

<400> SEQUENCE: 2
ttgagcgggt gccagaaat                                               19

<210> SEQ ID NO 3
<211> LENGTH: 21
<212> TYPE: DNA
<213> ORGANISM: Artificial Sequence
<220> FEATURE:
<223> OTHER INFORMATION: forward primer of OsCCX2

<400> SEQUENCE: 3
cgtccttcgt ctcgctctat g                                            21

<210> SEQ ID NO 4
<211> LENGTH: 22
<212> TYPE: DNA
<213> ORGANISM: Artificial Sequence
<220> FEATURE:
<223> OTHER INFORMATION: reverse primer of OsCCX2

<400> SEQUENCE: 4
cggataggag gcaatgaagg ta                                           22
```

CULTIVATION METHOD FOR INCREASING YIELD OF RATOONING RICE AND REDUCING CADMIUM CONTENT AND USE THEREOF

CROSS REFERENCE TO RELATED APPLICATION

This application claims the priority of Chinese Patent Application No. 202210351001.5, entitled "Cultivation method for increasing yield of ratooning rice and reducing cadmium content and use thereof" filed with the China National Intellectual Property Administration on Apr. 2, 2022, which is incorporated herein by reference in its entirety.

TECHNICAL FIELD

The present disclosure belongs to the technical field of agricultural planting, in particular to a cultivation method for increasing yield of ratooning rice and reducing cadmium content and use thereof.

BACKGROUND ART

Ratooning rice refers to rice which is cultivated by differentiating axillary buds at the last 2-5 nodes of the previous crop of rice into ears to harvest an extra season of rice after one season of middle-season rice harvest. It is mainly distributed in the tropical and subtropical monsoon climate regions in China, especially in the rice region of the Yangtze River plain in the middle and lower reaches, and the Sichuan Basin and Yunnan-Guizhou Plateau in the upper reaches of Yangtze River, where the light and heat conditions are sufficient for one season of rice but insufficient for two seasons of rice. It has a long history of cultivation. However, due to improper control of key planting links such as the management of sowing period in the first season, the selection of suitable varieties and the water and fertilizer management after a harvest in the first season, the yield of ratooning rice in the ratooning season has been maintained at a low level. In recent years, ratooning rice has achieved the characteristics of saving labor, fertilizer, water, and seeds, and high yield and quality by optimization of rice varieties and management of cultivation link, creating higher comprehensive benefits as compared with the traditional planting pattern of single and double season rice. In particular, the extension area of ratooning rice in Hubei. Jiangxi. Hunan. Sichuan and Fujian has increased year by year. The Yangtze River basin is the region with the fastest economic development in China and one of the regions with the most frequent mining activities in China.

At present, the problem of excessive cadmium (Cd) in rice caused by soil Cd contamination is serious, which has become an important bottleneck restricting the high-quality development of rice industry. Therefore, it is of great significance to develop a high-yield and low-Cd cultivation method for ratooning rice of moderately and mildly Cd-contaminated rice fields according to the production demand of ratooning rice in the region, thereby improving the comprehensive benefit of ratooning rice and realizing the safe utilization of-contaminated arable land. There are only a few reports on the accumulation characteristics and control strategies of the heavy metal Cd in ratooning rice. Relevant technical support is seriously insufficient. There is no report on how to plant ratooning rice with high-yield and low content of Cd in Cd-contaminated soil.

SUMMARY

In view of this, the present disclosure aims to provide a cultivation method for increasing yield of ratooning rice and reducing Cd content and use thereof, which may realize the safe utilization of ratooning rice in rice fields slightly contaminated by Cd. and significantly improve the comprehensive benefits of ratooning rice.

The present disclosure provides a cultivation method for increasing yield of ratooning rice and reducing Cd content, including the following steps:

sowing seeds of ratooning rice in middle and late March of a year, conducting transplantion in middle April of the year for growth in a Cd-contaminated rice field, carrying out water and fertilizer management of the first season rice, harvesting a first season rice at a position between 1st and 2nd last nodes thereof and carrying out water and fertilizer management of a second season rice.

In one embodiment, the first season rice is harvested at a 90% maturity.

In one embodiment, the 90% maturity refers to a stage where first to third last leaves of the first season rice are obviously green and grains of the first season rice are at a stage of wax ripeness.

In one embodiment, the ratooning rice includes early/middle season indica rice varieties.

In one embodiment, a stubble height of the first season rice is 40-60 cm.

In one embodiment, the water and fertilizer management of the first season rice includes a first water management and a first fertilizer management;

the first fertilizer management includes applying a first season fertilizer and a bud-promoting fertilizer;
the first season fertilizer is a compound fertilizer, the compound fertilizer is applied at 650 kg/ha;
the bud-promoting fertilizer includes urea, and the bud-promoting fertilizer is applied at 130-260 kg/ha one week before a harvest of the first season rice;
the first water management includes keeping a height of field surface water at 2-6 cm 10 days before the first rice harvest.

In one embodiment, the water and fertilizer management of the second season rice includes a second water management and a second fertilizer management;

the second fertilizer management includes applying a tiller fertilizer and a foliar fertilizer;
the tiller fertilizer is a compound fertilizer, the tiller fertilizer is applied at 325-390 kg/ha 5-7 days after a harvest of the first season rice;
the foliar fertilizer includes the following components by mass: 10-20 parts of $ZnSO_4$, 5-10 parts of nano-selenium and 30-40 parts of nano-silicon dioxide;
the foliar fertilizer is applied at a jointing stage and a flowering-grouting stage of the second season rice;
the second water management includes continuous flooding of the second season rice at a height of 5-10 cm.

In one embodiment, a mass ratio of nitrogen, phosphorus and potassium in the compound fertilizer is 18:12:12.

In one embodiment. Cd in the Cd-contaminated rice field is 0.3-1.5 mg/kg.

The present disclosure provides a use of the cultivation method in planting in Cd-contaminated rice field.

The present disclosure provides a cultivation method for increasing yield of ratooning rice and reducing Cd content, including the following steps: sowing seeds of ratooning rice in middle and late March of each year, transplanting the ratooning rice to Cd-contaminated rice field for growth to obtain a first season rice in middle April of the same year, carrying out water and fertilizer management of the first season rice, harvesting the first season rice and carrying out water and fertilizer management of a second season rice, a harvesting position of the first season rice is between the last 1 node and the last 2 node. In the present disclosure, the field experiment results of 3 years have clarified the influencing factors of Cd content in rice and yield of ratooning rice when ratooning rice is planted in Cd-contaminated rice field. The sowing and transplanting time is reasonably adjusted to ensure the appropriate accumulated temperature conditions for the first and second seasons of rice. At the same time, the harvesting height is strictly controlled to increase the number of stubble nodes and improve the spike rate of axillary bud (improving the effective spikes). The interception effect of nodes on Cd is fully utilized to reduce the accumulation of Cd in brown rice and improve the yield and quality of ratooning rice, so as to cultivate and harvest ratooning rice with high yield and low Cd. It can be seen that the system of rice-ratooning rice provided by the present disclosure has the advantages of safety and high yield on Cd-contaminated rice field, with simple operation, and easy popularization, etc. The system provides technical support for the safe utilization of Cd-contaminated rice field.

In one embodiment, the ratooning rice of the present disclosure includes early/middle season indica rice varieties. As the planting object of the present disclosure, the early/middle season indica rice varieties have a growth period of no more than 135 days, which is conducive to ensuring that the rice is in a suitable growth temperature condition. Compared with other rice varieties, the early/middle season indica rice varieties are more conducive to acquisition of low Cd and high yield rice.

In one embodiment, the harvesting time of the first season rice is specifically defined in the present disclosure, which is conducive to avoiding the aging of rice plants, ensuring the high survival rate of ratooning buds, and further improving the yield of rice.

In one embodiment, the management method of water and fertilizer for the first season and second season rice is specifically defined in the present disclosure. The adaptive and coordinated water and fertilizer management is conducive to promoting the growth of rice, decreasing the transport capacity of Cd in ratooning rice and reducing the activity of Cd.

DETAILED DESCRIPTION OF THE EMBODIMENTS

Figure 1:
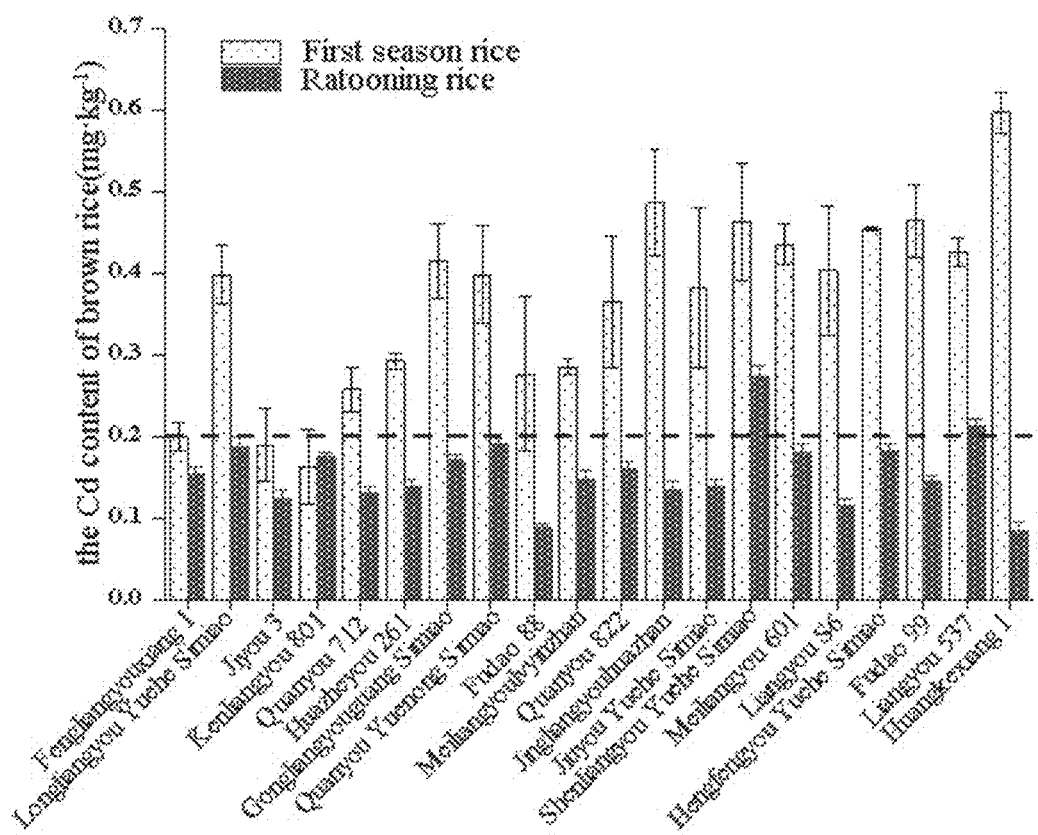
FIG. 1 shows the Cd content (mg·kg$^{-1}$) of brown rice for screen of the first and second season rice varieties.

The present disclosure provides a cultivation method for increasing yield of ratooning rice and reducing Cd content, including the following steps:
sowing seeds of ratooning rice in middle and late March of a year, conducting transplantion in middle April of the year for growth in a Cd-contaminated rice field, carrying out water and fertilizer management of a first season rice, harvesting the first season rice at a position between 1st and 2nd nodes and carrying out water and fertilizer management of a second season rice.

In the present disclosure, appropriate accumulated temperature is a necessary condition to ensure the robust growth of ratooning rice. The specific sowing and transplanting time of ratooning rice seeds defined by the present disclosure guarantees the first season rice to quickly adapt to the environment. In an embodiment of the present disclosure, ratooning rice seeds are sowed in middle and late March and transplanted in middle April to ensure that there are suitable conditions for the accumulation of temperature when rice seedlings are transplanted to rice fields.

In one embodiment, the ratooning rice preferably includes early/middle season indica rice varieties. The early/middle season indica rice varieties preferably include one or more of the following rice varieties: Fengliangyouxiang 1. Jiyou 3 and Kenliangyou 801. The growth period of the early/middle season indica rice varieties is not longer than 140 days, which is conducive to keeping the whole growth period of ratooning rice in a better accumulated temperature condition, and a long growth period counts otherwise against the cultivation objective of high yield and low Cd.

In one embodiment, the Cd-contaminated rice field is preferably moderately and mildly Cd-contaminated rice field. The soil pH of the moderately and mildly Cd-contaminated rice field is between the risk control value and the risk screening value (0.3-1.5 mg/kg) according to the "Environmental quality standards for soil of agricultural land. GB15618-2018".

In one embodiment, the water and fertilizer management of the first season rice preferably includes a first water management and a first fertilizer management. The first fertilizer management includes a first season fertilizer and a bud-promoting fertilizer. The first season fertilizer is a compound fertilizer. A mass ratio of nitrogen, phosphorus and potassium in the compound fertilizer is 18:12:12. The compound fertilizer is preferably applied at 650 kg/ha 1-3 days before the transplanting of the first season rice. The bud-promoting fertilizer is preferably urea, and the bud-promoting fertilizer is preferably applied at 130-260 kg/ha, more preferably 195 kg/ha, one week before a harvest of the first season rice. The first water management includes keeping the field surface water height of 2-6 cm 10 days before the first rice harvest, which is used to promote the formation of axillary buds in the ratooning season, decrease the bioavailability of soil Cd and reduce the absorption of Cd.

In one embodiment, the first season rice is preferably harvested at a 90% maturity. The 90% maturity of the first season rice preferably refers to a stage where first to third last leaves of the first season rice are obviously green and grains of the first season rice are at a stage of wax ripeness. Early harvesting is to avoid plant aging, ensure the survival rate of ratooning buds and improve yield, the effect of which on Cd is unclear. A stubble height of the first season rice is preferably 40-60 cm, more preferably 45-55 cm, most preferably 50 cm. According to the experimental results of the present disclosure, high stubble (more than 60 cm) can significantly improve the yield of ratooning rice, improve the effective spikes of ratooning rice, and low stubble (less than 20 cm) is not conducive to yield. Median stubble (40-60 cm) is conducive to high yield and low Cd.

In one embodiment, the water and fertilizer management of the second season rice includes a second water management and a second fertilizer management. The second fertilizer management includes applying a tiller fertilizer and a foliar fertilizer. The tiller fertilizer is preferably a compound fertilizer. A mass ratio of nitrogen, phosphorus and potassium in the compound fertilizer is preferably 18:12:12. The tiller fertilizer is applied preferably 5-7 days, more preferably 6 days after the harvest of the first season rice. The tiller fertilizer is preferably applied at 325-390 kg/ha, more preferably at 364 kg ha. In one embodiment, the foliar fertilizer includes the following components by mass: 10-20 parts of nano-zinc oxide. 5-10 parts of nano-selenium and 30-40 parts of nano-silicon dioxide, and preferably includes 12-18 parts of nano-zinc oxide. 6-8 parts of nano-selenium and 32-38 parts of nano-silicon dioxide, and more preferably 15 parts of nano-zinc oxide. 7 parts of nano-selenium and 35 parts of nano-silicon dioxide. The foliar fertilizer is preferably applied at the jointing and flowering-grouting stages of the second season rice. The foliar fertilizer is preferably applied at 455-520 L ha, with a concentration of 0.2%-0.3% by mass. The spraying of foliar fertilizer is mainly to improve the growth of ratooning rice, increase the spike rate and yield of ratooning rice, and reduce the transport capacity of Cd in ratooning rice. The principle for nano foliar fertilizer to reduce Cd is mainly to affect the relative expression of Cd transport genes $OsCCX_2$ and OsNramp2 in the nodes by increasing the retention of Cd in the stems and leaves of ratooning rice. The second water management includes continuous flooding of the second season rice at a preferable height of 5-10 cm. The continuous flooding improves the growth of buds of ratooning rice, increases yield, and reduces Cd activity.

In one embodiment, the content of Cd in brown rice obtained by the above cultivation method is 0.09-0.20 mg·kg$^{-1}$, and the yield of ratooning rice is 3-5 t·ha$^{-1}$. It can be seen that the cultivation method of the present disclosure is suitable for Cd-contaminated rice field. The ratooning rice obtained by the cultivation method of the present disclosure has low Cd and high yield. Therefore, the present disclosure provides a use of the cultivation method in planting in Cd-contaminated rice field.

The following is a detailed description of the cultivation method for increasing yield of ratooning rice and reducing cadmium content and use thereof provided by the present disclosure in combination with examples, but they should not be understood as limiting the protection scope of the present disclosure.

Example 1

Screening Test of Ratooning Rice Varieties with High Yield and Low Accumulation
1. Information of planting site: paddy soil derived from yellow brown earth in Qichun County, Hubei Province, with a content of Cd being 1.08 mg/kg, and pH being 5.86;
2. Ratooning rice varieties to be screened: 20 local middle season rice varieties (see FIG. 1), with a growth period of 118-140 days.
3. A plot test was set up. The area of each plot was 20 m$^2$. Each process was repeated 3 times and arranged in a completely random block. Water management: drainage was carried out 20 days before the harvest of rice in the first season. Flooding was carried out 10 days before harvest. Flooding was continued in the early ratooning season. Drainage was carried out 10 days before the harvest of rice in the first season. Water and fertilizer management: 650 kg ha (18-12-12) of compound fertilizer was applied as a first season fertilizer for rice. 195 kg/ha urea was applied as a bud promoting fertilizer one week before the first harvest. 325 kg/ha (18-12-12) of compound fertilizer was supplemented as seedling fertilizer within 6 days after a harvest. All rice in each plot was harvested separately, threshed, dried, and weighed to obtain the yield. After full mixing, 500 g of rice was separated and hulled by using a grain and oil machinery-rubber roll husker (GB/T29898-2013). The obtained brown rice was dried to constant weight in a 70° C. drying oven, crushed through a 60 mesh sieve, digested by $HNO_3$—$HClO_4$ (5:1, volume ratio), and the content of Cd in brown rice was determined by ICP-Ms.

Figure 2:
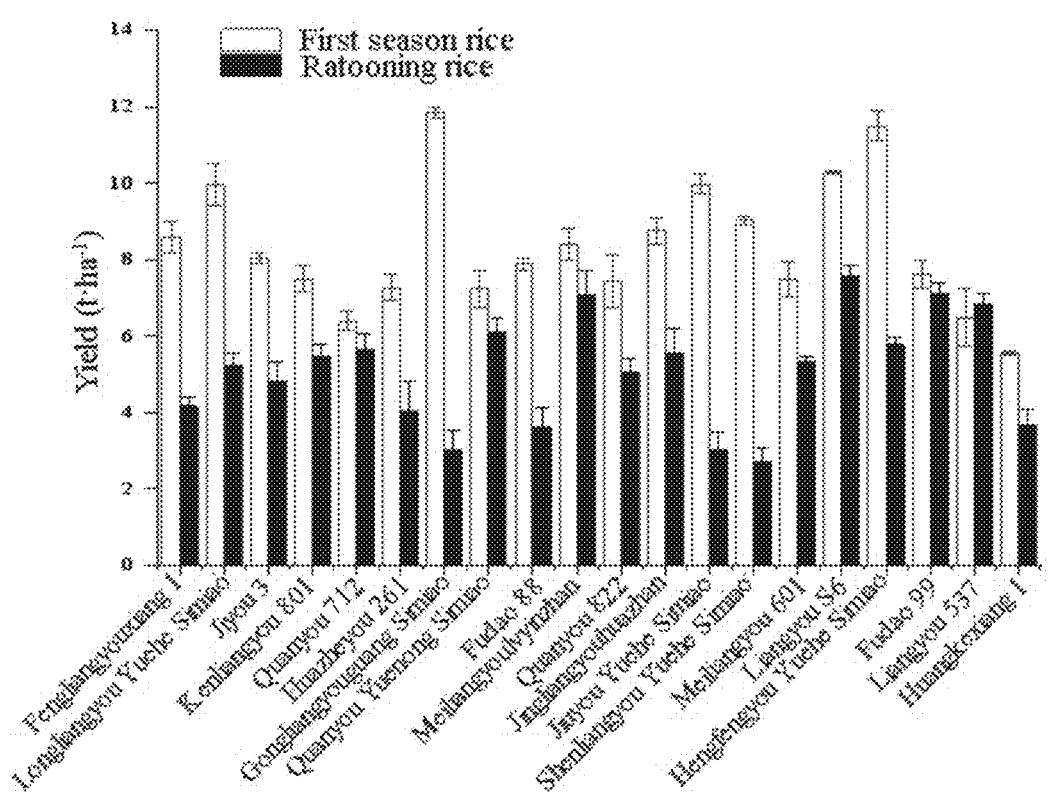
FIG. 2 shows the yield (t·ha$^{-1}$) of the first and second season rice varieties for screen.

The results are shown in FIG. 1 and FIG. 2. It could be seen that the yields of Liangyou 537 and Fengliangyouxiang 1 were higher. The content of Cd in Fengliangyouxiang 1, Kenliangyou 801 and Jiyou 3 was lower. The content of Cd in brown rice of the second season was significantly lower than that of rice in the first season. Fengliangyouxiang 1, Jiyou 3 and Kenliangyou 801 achieved the objective that the two seasons of rice should meet the standard for Cd and had high yield.

Example 2

Optimization Test of Stubble Height

Fengliangyouxiang 1 was taken as the planting variety of ratooning rice. five varieties were selected to carry out different stubble height tests and split-plot tests. The stubble heights were 20 cm (the last 4 nodes), 40 cm (the last 2 nodes) and 60 cm (the last 1 nodes), respectively. The water and fertilizer management was the same as Example 1. The content of Cd and the yield of brown rice in the first season and ratooning season were measured respectively according to the relevant method of Example 1.

The results are shown in Table 1. The results in Table 1 showed that high stubble height was conducive to achieving high yield, and low stubble height is conducive to reducing content of Cd. Therefore, when the stubble height was 40 cm, the rice had lower Cd and higher yield.

TABLE 1

Effect of stubble height on content of Cd in brown rice and yield of ratooning rice

| Varieties | Stubble height (cm) | Content of Cd in brown rice (mg · kg$^{-1}$) | Yield of ratooning rice (t · ha$^{-1}$) |
|---|---|---|---|
| Shenliangyou Yuehe | 60 | 0.21 | 2.91 |
| Simiao | 40 | 0.16 | 2.67 |
| Fengliangyouxiang 1 | 60 | 0.14 | 4.87 |
|  | 40 | 0.09 | 3.79 |
|  | 20 | 0.28 | 3.58 |
| Hengfengyou Yuehe | 60 | 0.20 | 4.09 |
| Simiao | 20 | 0.24 | 3.46 |
|  | 40 | 0.18 | 3.58 |
| Liangyou 537 | 60 | 0.25 | 3.71 |
|  | 20 | 0.25 | 3.57 |
|  | 40 | 0.19 | 3.65 |

Example 3

Resistance and control test of foliar microelement fertilizer: Fengliangyouxiang 1 as the test variety, and the paddy soil derived from yellow brown earth with a total Cd of 1.08 mg/kg and a pH value of 5.62 were selected for the resistance and control test of foliar microelement fertilizer. 11 treatments were set respectively: clean water spraying group (control); nano Se spraying group; nano SiO$_2$ spraying group; nano ZnO spraying group; nano Se and nano SiO$_2$ spraying group; nano SiO$_2$ and nano ZnO spraying group; nano Se, nano SiO$_2$ and nano ZnO spraying group. The specific concentration was shown in Table 2. The foliar spraying was carried out at the seedling stage and booting stage of ratooning rice, respectively, in a sunny and windless afternoon. When it rained within 48 hours after spraying, the spraying was repeated once according to 50 mL·m$^{-2}$. Other water and fertilizer management were the same as in Example 1. The control and nano Se, nano SiO$_2$, and nano ZnO spraying group were selected to collect aboveground part of 5 ratooning rice plants seven days after the spraying. The stems and leaves of aboveground part of 5 ratooning rice plants were separated, washed with deionized water, blotted with absorbent paper and quickly frozen with liquid nitrogen to obtain frozen stems and leaves. The frozen stems and leaves were preserved with dry ice and transported to Wuhan Service biotechnology company to extract RNA, which was amplified by real-time fluorescent PCR To determine the relative expression of OsHMA$_2$ (Primer sequence: CGCCATCTCCCAATCCCAAA (SEQ ID NO:1), TTGAGCGGGTGCCAGA AAT (SEQ ID NO:2)) and OsCCX$_2$ (Primer sequence: CGTCCTTCGTCTCGCTC-TATG (SEQ ID NO:3), CGGATAGGAGGCAATGAAGGT A (SEQ ID NO:4)). The content of Cd and yield of brown rice in the first and ratooning seasons were determined using the method in Example 1.

The results showed that the content of Cd in brown rice of the optimal foliar treatment and the control were 0.09 mg kg$^{-1}$ and 0.47 mg kg$^{-1}$, respectively, and the yield was 3.16t·ha$^{-1}$ and 2.82t·ha$^{-1}$, respectively. Compared with the control, the content of Cd of rice treated with foliar microelement fertilizer decreased by 80.85% and the yield increased by 10.7%. The relative expression levels of OsHMA$_2$ in nodes of the optimal treatment and the control were 5.257 and 0.978, respectively, and the relative expression levels of OsCCX$_2$ were 0.657 and 1.121, respectively. The expression of OsHMA$_2$ in stem nodes could reduce the transport of Cd, and foliar treatment significantly affects the migration of Cd from stem nodes to grains.

TABLE 2

Effects of foliar spraying of nano materials on content of Cd and yield of ratooning rice

| Treatments | Concentration (mg · L$^{-1}$) | Content of Cd in brown rice of ratooning rice (mg · kg$^{-1}$) | Yield of ratooning rice t · ha$^{-1}$ |
|---|---|---|---|
| Control(Conventional cultivation) | — | 0.47 ± 0.03 a | 2.72 ± 0.12b |
| nano Se | 0.5 | 0.28 ± 0.02 b | 2.75 ± 0.21b |
| nano Se | 1 | 0.27 ± 0.02 b | 2.88 ± 0.15ab |
| nano SiO$_2$ | 200 | 0.32 ± 0.01 b | 2.76 ± 0.13b |
| nano SiO$_2$ | 500 | 0.22 ± 0.03 bc | 2.78 ± 0.08b |
| nano ZnO | 75 | 0.21 ± 0.05 bc | 2.89 ± 0.19ab |
| nano ZnO | 150 | 0.19 ± 0.04 c | 2.91 ± 0.21a |
| nano Se + nano SiO$_2$ | 0.5 + 200 | 0.16 ± 0.04 c | 2.94 ± 0.20a |
| nano Se + nano ZnO | 0.5 + 75 | 0.19 ± 0.02 c | 2.89 ± 0.11ab |
| nano ZnO + nano SiO$_2$ | 75 + 200 | 0.13 ± 0.02d | 2.87 ± 0.12ab |
| nano Se + nano SiO$_2$ + nano ZnO | 0.5 + 75 + 200 | 0.09 ± 0.02d | 3.16 ± 0.12a |

Note:
different lowercase letters indicate significant differences in the same test index, P < 0.05.

The description of the above embodiments is only used to help understand the method and core idea of the present disclosure. It should be pointed out that for those skilled in the art, several modifications and improvements can be made without departing from the technical solution of the present disclosure, which should also be regarded as the protection scope of the present disclosure. Various modifications to these embodiments will be obvious to those skilled in the art, and the general principles defined herein can be implemented in other embodiments without departing from the spirit or scope of the present disclosure. Therefore, the present disclosure should not be limited to the embodiments shown herein, and the widest scope should be consistent with the principles and novel features disclosed herein.

What is claimed is:

1. A cultivation method for increasing yield of ratooning rice and reducing Cd content, comprising
sowing seeds of ratooning rice in middle and late March of a year, conducting transplantation in middle April of the year for growth in a Cd-contaminated rice field, carrying out water and fertilizer management of a first season rice, harvesting the first season rice at a position between 1st and 2nd last nodes thereof, and carrying out water and fertilizer management of a second season rice,
wherein the ratooning rice comprises early/middle season indica rice varieties,
the early/middle season indica rice varieties comprising one or more of the following rice varieties: Fengliangyouxiang 1, Jiyou 3 and Kenliangyou 801, wherein a stubble height of the first season rice is 40-60 cm.

2. The cultivation method according to claim 1, wherein the first season rice is harvested at a 90% maturity.

3. The cultivation method according to claim 2, wherein the 90% maturity refers to a stage where first to third last leaves of the first season rice are green and grains of the first season rice are in a stage of wax ripeness.

4. The cultivation method according to claim 1, wherein the water and fertilizer management of the first season rice comprises a first water management and a first fertilizer management;

the first fertilizer management comprises applying a first season fertilizer and a bud-promoting fertilizer;
the first season fertilizer is a compound fertilizer, and the compound fertilizer is applied at 650 kg/ha;
the bud-promoting fertilizer comprises urea, and is applied at 130-260 kg/ha one week before a harvest of the first season rice,
the first water management comprises keeping the field surface water height at 2-6 cm 10 days before the harvest of the first rice.

5. The cultivation method according to claim 4, wherein a mass ratio of nitrogen, phosphorus and potassium in the compound fertilizer is 18:12:12.

6. The cultivation method according to claim 1, wherein the water and fertilizer management of a second season rice comprises a second water management and a second fertilizer management;
the second fertilizer management comprises applying a tiller fertilizer and a foliar fertilizer;
the tiller fertilizer is a compound fertilizer, and is applied at 325-390 kg/ha 5-7 days after a harvest of the first season rice;
the foliar fertilizer comprises the following components by mass: 10-20 parts of nano-zinc oxide, 5-10 parts of nano-selenium and 30-40 parts of nano-silicon dioxide, and is applied at a jointing stage and a flowering-grouting stage of the second season rice;
the second water management comprises continuous flooding of the second season rice at a height 5-10 cm.

7. The cultivation method according to claim 6, wherein a mass ratio of nitrogen, phosphorus and potassium in the compound fertilizer is 18:12:12.

8. The cultivation method according to claim 1, wherein a Cd content in the Cd-contaminated rice field is 0.3-1.5 mg/kg.

* * * * *